(12) United States Patent
Sugiura

(10) Patent No.: US 11,836,056 B2
(45) Date of Patent: Dec. 5, 2023

(54) VEHICULAR APPARATUS

(71) Applicant: DENSO CORPORATION, Kariya (JP)

(72) Inventor: Hideyuki Sugiura, Kariya (JP)

(73) Assignee: DENSO CORPORATION, Kariya (JP)

( * ) Notice: Subject to any disclaimer, the term of this patent is extended or adjusted under 35 U.S.C. 154(b) by 60 days.

(21) Appl. No.: 17/454,974

(22) Filed: Nov. 15, 2021

(65) Prior Publication Data

US 2022/0075697 A1 Mar. 10, 2022

Related U.S. Application Data

(63) Continuation of application No. PCT/JP2020/017204, filed on Apr. 21, 2020.

(30) Foreign Application Priority Data

May 16, 2019 (JP) .................................. 2019-092880

(51) Int. Cl.
*G06F 11/16* (2006.01)
*B60K 35/00* (2006.01)
(Continued)

(52) U.S. Cl.
CPC ............ *G06F 11/162* (2013.01); *B60K 35/00* (2013.01); *G06F 3/147* (2013.01); *B60K 37/02* (2013.01); *B60K 2370/155* (2019.05); *B60K 2370/1529* (2019.05); *B60K 2370/195* (2019.05); *B60K 2370/20* (2019.05); *B60K 2370/27* (2019.05); *B60K 2370/347* (2019.05);
(Continued)

(58) Field of Classification Search
CPC .... G06F 11/162; G06F 3/147; G06F 11/0751; G06F 11/1438; G06F 11/0712; G06F 11/0739; G06F 11/0793; G06F 11/07; G06F 9/45533; B60K 35/00; B60K 2370/1529; B60K 2370/577; B60K 2370/155; B60K 2370/195; B60K 2370/95; B60K 37/02; B60K 2370/20; B60K 2370/27; B60K 2370/347; G02B 27/01; G09G 2330/12; G09G 2340/12; G09G 2358/00; G09G 2380/10; G09G 5/377; G09G 2370/20
See application file for complete search history.

(56) References Cited

U.S. PATENT DOCUMENTS

2003/0020757 A1\* 1/2003 Aratani ..................... G09G 5/00
386/E5.07
2012/0007795 A1\* 1/2012 Selbrede ............... G02F 1/1347
345/6
(Continued)

FOREIGN PATENT DOCUMENTS

JP 2013205883 A 10/2013

*Primary Examiner* — Douglas M Wilson
(74) *Attorney, Agent, or Firm* — Harness, Dickey & Pierce, P.L.C.

(57) ABSTRACT

A vehicular apparatus is provided in which a plurality of operating systems each perform a display on a display device. The vehicular apparatus includes a controller unit. The controller unit is configured to implement a virtual environment to operate the plurality of operating systems. The controller is further configured to monitor and detect a malfunction in the display performed on the display device in the virtual environment, and to shield a display area where an incorrect display may be performed in response to the malfunction being detected.

8 Claims, 13 Drawing Sheets

(51) Int. Cl.
*G06F 3/147* (2006.01)
*G06F 11/07* (2006.01)
*G09G 5/377* (2006.01)
*G06F 11/14* (2006.01)
G06F 9/455 (2018.01)
G02B 27/01 (2006.01)
B60K 37/02 (2006.01)

(52) U.S. Cl.
CPC .... *B60K 2370/577* (2019.05); *B60K 2370/95* (2019.05); *G02B 27/01* (2013.01); *G06F 9/45533* (2013.01); *G06F 11/07* (2013.01); *G06F 11/0712* (2013.01); *G06F 11/0739* (2013.01); *G06F 11/0751* (2013.01); *G06F 11/0793* (2013.01); *G06F 11/1438* (2013.01); *G09G 5/377* (2013.01); *G09G 2300/023* (2013.01); *G09G 2330/02* (2013.01); *G09G 2340/12* (2013.01); *G09G 2358/00* (2013.01); *G09G 2370/20* (2013.01); *G09G 2380/10* (2013.01)

(56) References Cited

U.S. PATENT DOCUMENTS

| | | | | |
|---|---|---|---|---|
| 2017/0206417 A1* | 7/2017 | Aoyama | ............... | H04L 1/0061 |
| 2019/0333471 A1* | 10/2019 | Carazo | ................... | G09G 5/006 |
| 2020/0218487 A1* | 7/2020 | Rush | ...................... | B60K 35/00 |

* cited by examiner

VEHICULAR APPARATUS

CROSS REFERENCE TO RELATED APPLICATIONS

The present application is a continuation application of International Patent Application No. PCT/JP2020/017204 filed on Apr. 21, 2020, which designated the U.S. and claims the benefit of priority from Japanese Patent Application No. 2019-092880 filed on May 16, 2019. The entire disclosures of all of the above applications are incorporated herein by reference.

TECHNICAL FIELD

The present disclosure relates to a vehicular apparatus.

BACKGROUND

The display device connected to a vehicular apparatus may be shared by several systems. For example, there is disclosed a technique for sharing a display device between a vehicular apparatus and a mobile terminal connected to the vehicular apparatus.

In order to integrate a plurality of functions, a plurality of systems may be provided in a vehicular apparatus. Specifically, a virtual environment may be configured in a vehicular apparatus, and a plurality of operating systems may be operated in the virtual environment. Hereinafter, the operating system is referred to as an OS. In such a vehicular apparatus, each OS may individually perform a display on the display device.

SUMMARY

According to an example of the present disclosure, a vehicular apparatus is provided in which a plurality of operating systems each perform a display on a display device. The vehicular apparatus includes a controller unit. The controller unit is configured to implement a virtual environment to operate the plurality of operating systems. The controller is further configured to monitor and detect a malfunction in the display performed on the display device in the virtual environment, and to shield a display area where an incorrect display may be performed in response to the malfunction being detected.

BRIEF DESCRIPTION OF DRAWINGS

The objects, features, and advantages of the present disclosure will become more apparent from the following detailed description made with reference to the accompanying drawings. In the drawings.

DETAILED DESCRIPTION

Hereinafter, a plurality of embodiments will be described with reference to the drawings. In each embodiment, substantially common elements will be described with the same reference signs.

First Embodiment

Figure 1:
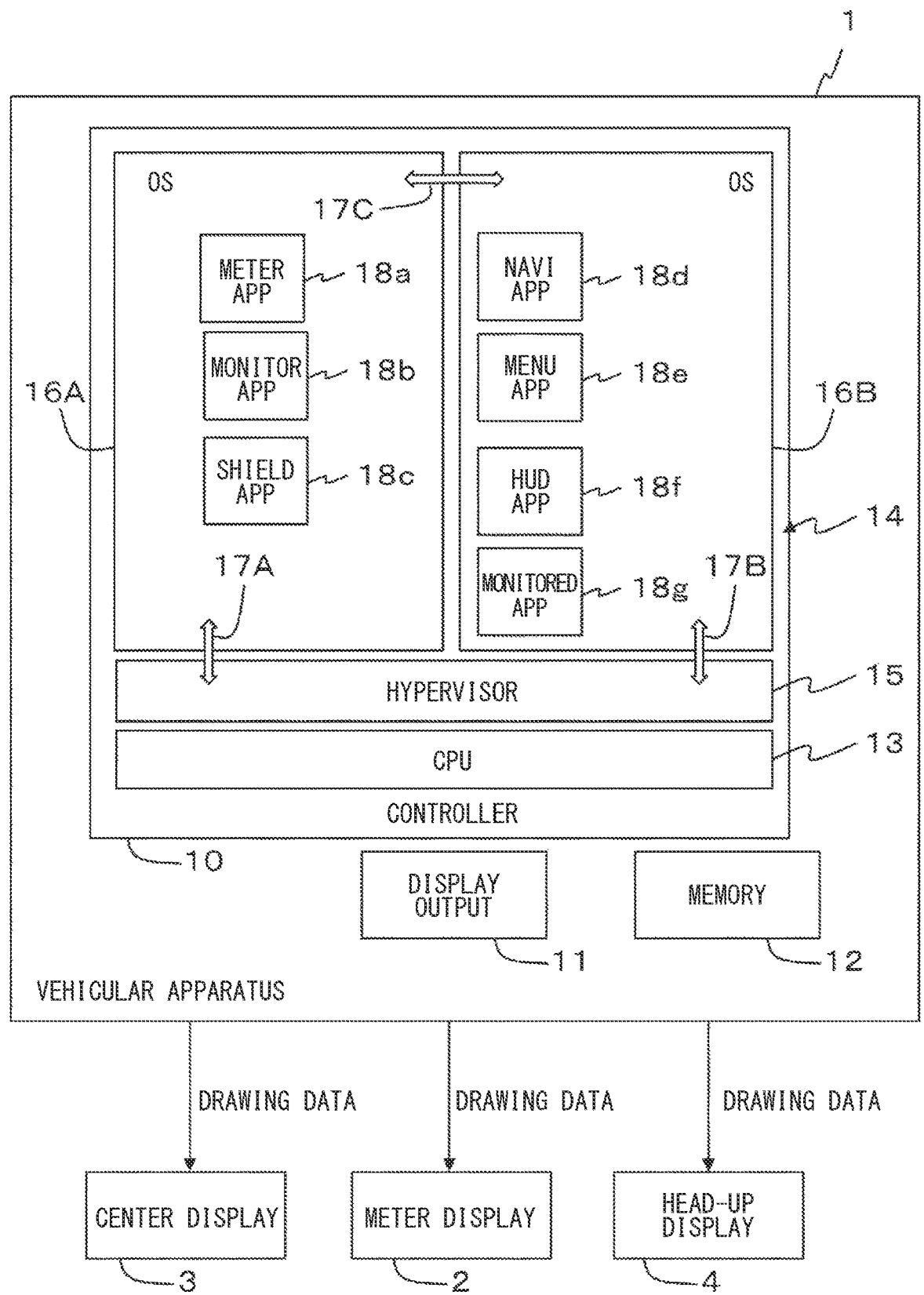
FIG. 1 is a diagram schematically showing a configuration of a vehicular apparatus according to a first embodiment.

Hereinafter, a first embodiment will be described. As shown in FIG. 1, a vehicular apparatus 1 is connected to, for example, a plurality of display devices of a meter display 2 (i.e., a meter display device 2), a center display 3 (i.e., a center display device 3), and a head-up display 4 (i.e., a head-up display device 4). The configuration of the display devices is an example; there is no need to be limited thereto. The vehicular apparatus 1 is included in a cockpit system 5 that realizes so-called vehicle infotainment together with the display devices.

The meter display 2 is assumed to be provided adjacent to the front of the driver on the dashboard. That is, the meter display 2 is provided at a position that is easy for the user to see, in other words, at a position that is within the user's field of view during normal operation. The meter display 2 is composed of, for example, a liquid crystal display or an organic EL display; for example, a speedometer, a tachometer, a warning light called a telltale, and/or the like is displayed in full graphic. Further, the meter display 2 may be provided as a combination of an analog speedometer, a tachometer, and/or a warning light with a display device.

The center display 3 is assumed to be provided adjacent to a so-called center console. The meter display 2 is composed of, for example, a liquid crystal display or an organic EL display; an example, a navigation screen image, an operation menu screen image, a music playback screen image, and/or the like is displayed.

The head-up display 4 is assumed to be provided adjacent to the front of the driver on the dashboard. That is, the head-up display 4 is provided at a position that is easy for the user to see, in other words, at a position that is within the user's field of view during normal operation. The head-up display 4, for example, projects the generated display image toward a projection surface such as a windshield or a combiner via an optical path such as a concave mirror or a lens, and forms a virtual image in the space in front of the driver. As an example, the head-up display 4 displays, for example, the vehicle speed, the distance to a corner, the direction of a turn, and the like.

Hereinafter, the information and images displayed on each display device are collectively referred to as a content. The contents illustrated above is an example. The same content can be displayed on the meter display 2 and the center display 3, for instance. That is, the vehicular apparatus 1 can seamlessly display between the display devices.

The vehicular apparatus 1 includes a controller unit 10, a display output unit 11, and one or more memories including a main memory 12. The controller unit 10 includes a CPU 13. The one or more memories are configured to store computer-implemented software programs including a plurality of operating systems 16, a hypervisor 15, a plurality of applications 18, to be executed by the CPU 13 to provide respective functions. A virtual environment 14 is built on the CPU 13. The virtual environment 14 is composed of the hypervisor 15 and two operating systems 16 in the present embodiment. Hereinafter, the operating system 16 will be referred to as OS 16. That is, the vehicular apparatus 1 is an integrated apparatus in which various functions are shared and processed by a plurality of OSs 16.

The CPU 13 includes a plurality of internal cores; one or more internal cores are assigned to each OS 16. Further, in FIG. 1, the controller unit 10 and the display output unit 11 are shown separately for the sake of simplification of the description. However, the display output unit 11 can be configured by, for example, an image processing unit built in the CPU 13. In addition to the image processing unit, a graphic processing unit in charge of drawing may be built in the CPU 13. Further, the display output unit 11 or the image processing unit built in the controller unit 11 may be implemented by an image processing application implemented on the OS 16A.

Various types of information can be transmitted between the hypervisor 15 and the OS 16A by a communication path 17A. Further, the hypervisor 15 and the OS 16B are connected so as to be able to transmit various types of information by a communication path 17B. Further, the OS 16A and the OS 16B are connected so as to be able to transmit various types of information by a communication path 17C. Note that the hypervisor 15 may be implemented as a part of the functions of the OS 16A; the OS 16B may be operated on the hypervisor 15. In addition, three or more OSs 16 can be operated in the virtual environment 14.

The OS 16A is a so-called real-time OS, and mainly executes a process that requires real-time performance such as a process related to vehicle running or safety, as compared with the OS 16B, for example. In general, such a real-time OS is less likely to cause a malfunction in the OS 16A itself, and can be considered to have relatively higher stability than a general-purpose OS because it can predict or limit the execution time of an application.

Therefore, the OS 16A implements an application for presenting information related to vehicle running and/or safety. For example, a speedometer or a tachometer needs to update the display periodically and in real time in order to present a change in vehicle speed and/or the like. In addition, the warning light needs to be displayed promptly when there is a situation that should be warned. Therefore, the OS 16A implements a meter application 18a for displaying a speedometer, a tachometer, and/or a warning light on the meter display 2.

In addition, a monitoring application 18b is implemented on the OS 16A. Although the details of the monitoring application 18b will be described later, the monitoring application 18b is realized by software as an application for monitoring a malfunction that occurs in the virtual environment 14. Although the details will be described later, this monitoring application 18b monitors the OS 16B and a malfunction related to the display on the display device by an application executed on the OS 16B. The monitoring application 18b may be configured to implement a monitoring unit 18b.

In addition, a shielding application 18c is implemented on the OS 16A. The shielding application 18c performs a process of shielding a display area where an incorrect display may be performed when a malfunction related to the display on the display device is detected by the monitoring application 18b. The details will be described later. More specifically, the shielding application 18c performs a process of shielding a display area, where an incorrect display may be performed, from the user's field of view. In the present embodiment, the shielding application 18c is implemented as an application executed on the OS 16A, which has relatively high stability. The shielding application 18c may be configured to implement a shielding unit 18c.

The OS 16B is a so-called general-purpose OS, and is generally considered to be relatively less stable than the OS 16A that is a real-time OS. In other words, the OS 16B or the application executed on the OS 16B is more likely to have a malfunction than the OS 16A. On the other hand, the OS 16B has an advantage that general-purpose processing such as a so-called multimedia function can be easily executed.

Therefore, as an example of the multimedia function, a navigation application 18d for processing the display of the navigation screen image, a menu application 18e for displaying the menu screen image, and a HUD application 18f for displaying on the head-up display 4 are implemented on the OS 16B. The navigation application 18d, the menu application 18e, or the HUD application 18f is an application that performs a display on a display device.

More specifically, the navigation application 18d, the menu application 18e, or the HUD application 18f is an application that generates a content to be displayed on the display device and processes drawing on the layer 19 described later. The graphic processing unit may be in charge of the actual drawing on the layer 19, for example.

The application executed on the OS 16B is a monitoring target by the monitoring application 18b, although the details will be described later. In this case, the navigation application 18d, the menu application 18e, or the HUD application 18f that performs a display on the display device is set as a monitoring target. Note that since the operation of a certain application may cause an overall malfunction of the OS 16B, even an application that does not perform a display on the display device may be monitored. In FIG. 1, those applications are shown as a monitored application 18g.

Figure 2:
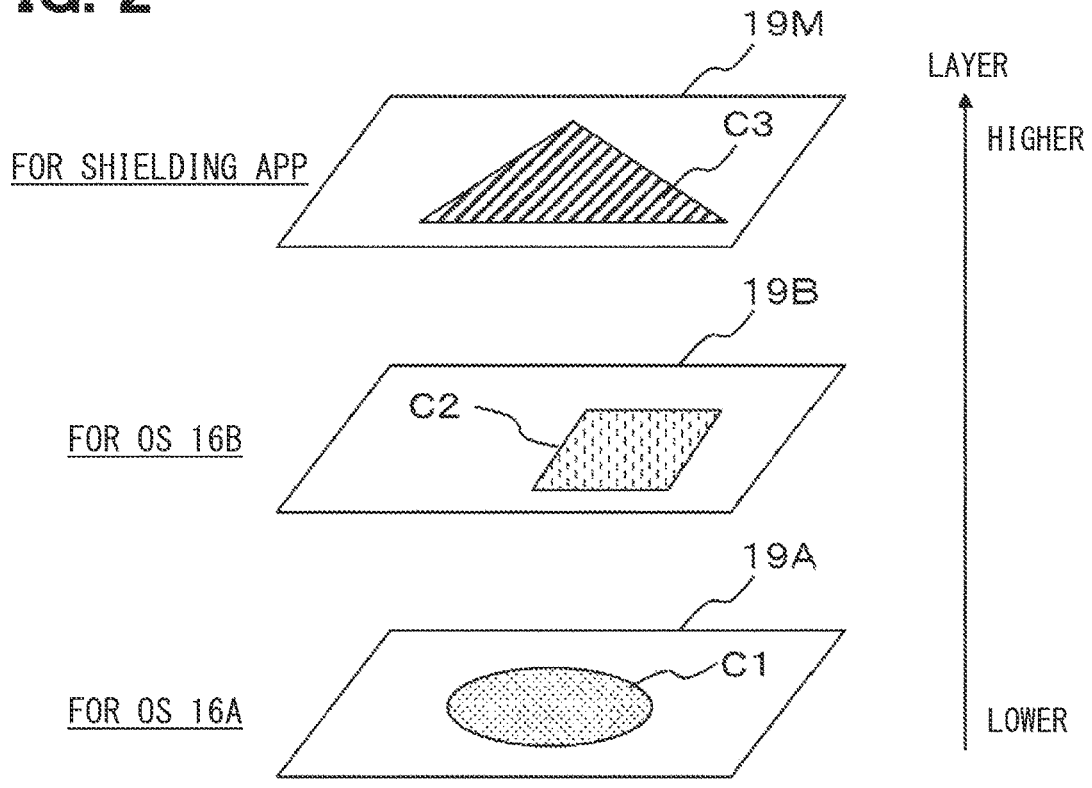
FIG. 2 is a diagram schematically showing a hierarchical structure of layers, a synthesizing mode, and a display mode.
Figure 2:
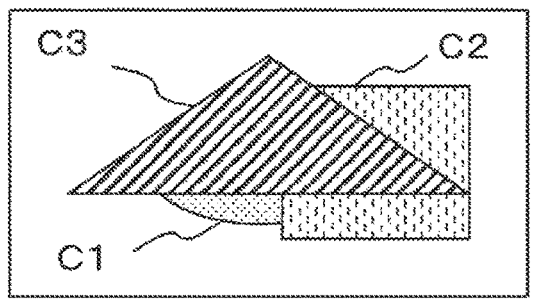
Figure 2:
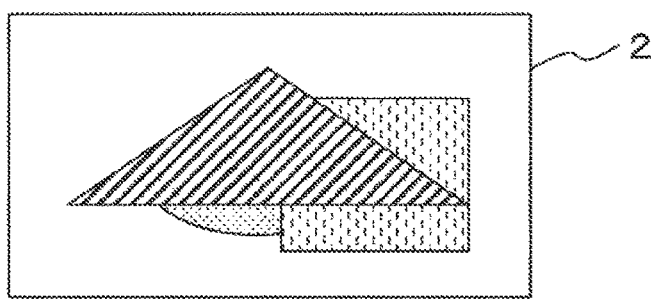

As shown in FIG. 2, the display output unit 11 synthesizes a plurality of layers 19A, 19B, 19M (as a synthesis target) with a hierarchical structure assigned respectively to the OS 16A, the OS 16B, and the shielding application 18c to provide a synthesized result or state (i.e., a synthesis result), and outputs the synthesis result as a drawing data to the display device, for example, in the LVDS format. At this time, the display output unit 11 synthesizes the layers 19 set as a synthesis target.

Specifically, in the vehicular apparatus 1, the OS 16A is assigned a layer 19A which is lower in each of the hierarchical structure than the layer 19B for the OS 16B and the layer 19M for the shielding application 18c. Further, the OS 16B is assigned a layer 19B which is higher in the hierarchical structure than the layer 19A for the OS 16A and lower in the hierarchical structure than the layer 19M for the shielding application 18c. Further, the shielding application

18c is assigned a layer 19M which is higher in the hierarchical structure than both the layers 19A, 19B for the OS 16A and the OS 16B.

Note that FIG. 2 illustrates the layers 19 having a three-layer structure, but the number of layers 19 is not limited to this. Note that it is assumed that the layer 19M is arranged higher than the layer 19A for the OS 16A and the layer 19 for the OS 16B. Each of these layers 19 is secured on the main memory 12 in the present embodiment.

Now, suppose that, for example, the OS 16A draws the content C1 on the layer 19A, the OS 16B draws the content C2 on the layer 19B, and the shielding application 18c draws the content C3 on the layer 19M. In this case, the display output unit 11 synthesizes the plurality of layers 19A, 19B, 19M such that the layer 19 that is relatively higher in the hierarchical structure is shown with priority over the layer 19 that is relatively lower in the hierarchical structure.

More specifically, as shown in FIG. 2 as a synthesis state, when the display output unit 11 performs a display on the display device, the display output unit 19 synthesizes the plurality of layers 19 to provide a synthesis result such that the content C2 is displayed in front of the content C1, and the content C3 is displayed in front of the content C2.

The display output unit 11 outputs the synthesis result as a drawing data. As a result, as shown in a display state in FIG. 2, for example, in the portions where the contents overlap on the meter display 2, the content C1 is hidden by the content C2 while the content C1 and the content C2 are hidden by the content C3. Hereinafter, the content drawn on the layer 19M by the shielding application 18c to shield the contents of the other layers 19A, 19B is referred to as a shielding content CM.

In the present embodiment, the layer 19M assigned to the shielding application 18c is set so as not to be a synthesis target by the display output unit 11 when a malfunction is not detected by the monitoring application 18b. If no malfunction is detected by the monitoring application 18b, only both the layer 19A assigned to the OS 16A and the layer 19B assigned to the OS 16B are synthesized. The details will be described later.

Further, the display output unit 11 may display either the layer 19A or the layer 19B without synthesizing the layers 19, or may enlarge or reduce the contents to synthesize. For example, the display output unit 11 does not synthesize the layers 19, as shown in a normal display mode in FIG. 3. The drawing data on the meter display 2 for displaying the speedometer image M1, the tachometer image M2, and the warning light image M3, which are the contents drawn on the layer 19A by the meter application 18a, may be output by the display output unit 11.

Figure 3:
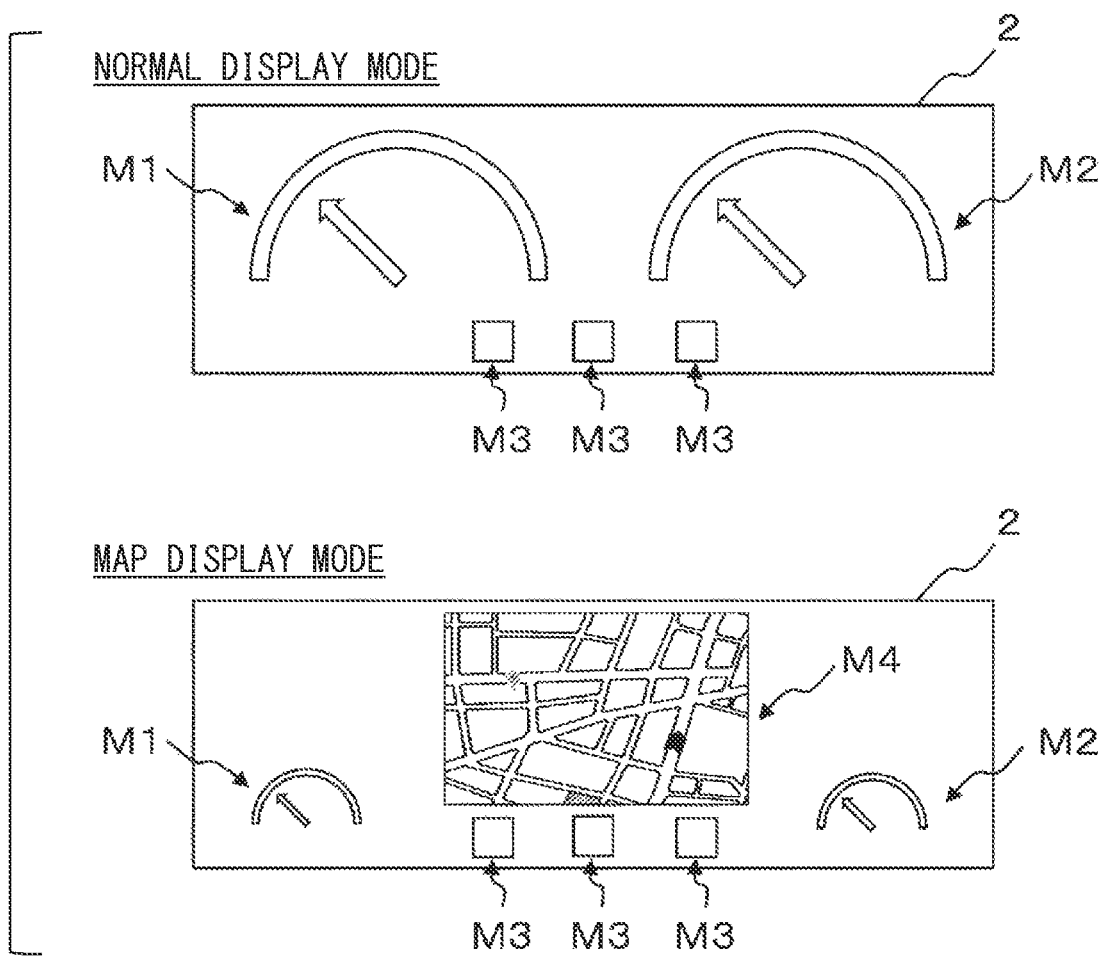
FIG. 3 is a diagram schematically showing an example of a display mode on a meter display.

Further, an example of synthesizing the layers 19 may be shown as a map display mode in FIG. 3. The drawing data for displaying (i) the speedometer image M1, the tachometer image M2, the warning light image M3, which are the contents drawn on the layer 19A by the meter application 18a and (ii) the navigation image M4, which is drawn on the layer 19B by the navigation application 18d may be output by the display output unit 11.

Figure 4:
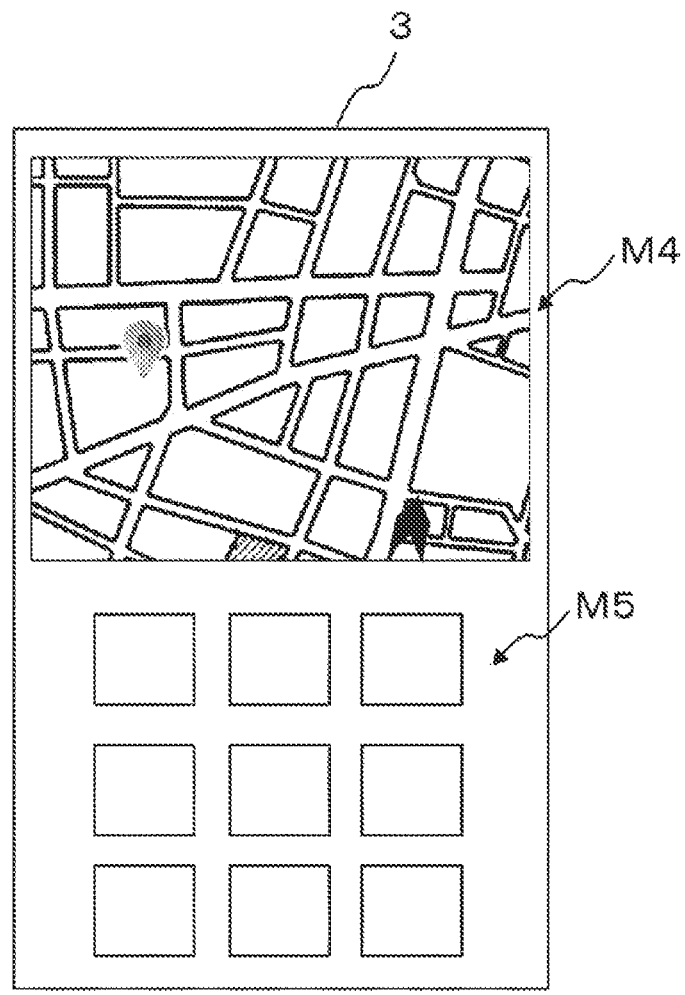
FIG. 4 is a diagram schematically showing an example of a display mode on a center display.
Figure 5:
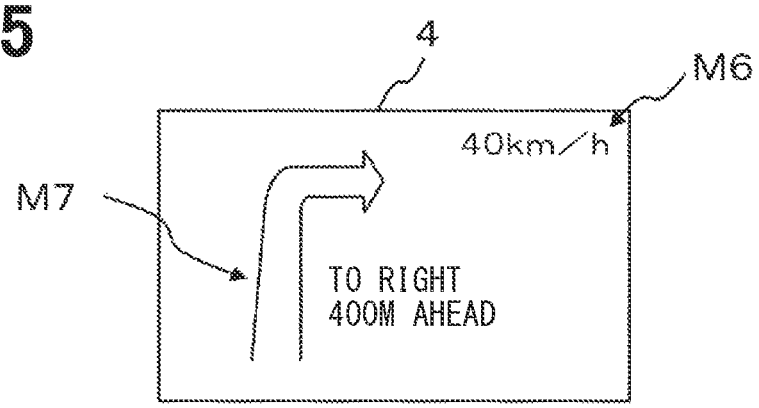
FIG. 5 is a diagram schematically showing an example of a display mode on a head-up display.

Further, an example in which the contents are drawn by a plurality of applications on the same layer 19 is shown in FIG. 4. In FIG. 4, the drawing data on the center display 3 for displaying the navigation image M4 and the menu image M5 is output by the display output unit 11. Further, an example of sharing the display device between the OSs 16 is shown in FIG. 5. In FIG. 5, the drawing data on the head-up display 4 for displaying a speed image M6 drawn on the layer 19B based on the speed information acquired from the OS 16A by the HUD application 18f and the course image M8 drawn on the layer 19B based on the route guidance information of the navigation application 18d are output by the display output unit 11.

Next, the operation of the above configuration will be described. If a malfunction occurs in one operating system in the multiple operating systems performing the displays on the display device, the display from the one operating system may malfunction. In this case, a known configuration may prevent such a malfunction. In the known configuration providing the operating systems independently, one operating system becomes a master to perform a display on the display device, and another system becomes a slave to request the master to perform the display. Even if a malfunction occurs in the slave operating system, it is considered that the malfunction in the display can be prevented by the master operating system simply stopping the import from the slave that is malfunctioning.

In contrast, the present embodiment provides a configuration of the vehicular apparatus 1 in which the virtual environment 14 is implemented to operate a plurality of OSs 16 and each OS 16 performs a display on a display device. If a malfunction occurs in the OS 16, a malfunction will occur in the display performed on the display device as it is, and an incorrect display will be performed. In this case, if the OS 16 may be provided as a master for displaying as in the known configuration, the load on the master OS 16 however becomes large. This may pose a risk that various highly integrated processes cannot be performed.

On the other hand, by implementing the virtual environment 14, it is possible to enable communication between the hypervisor 15 and each OS 16 via the communication paths 17A, 17B, and 17C as described above. Therefore, the vehicular apparatus 1 utilizes the virtual environment 14 to prevent an incorrect display from being performed when a malfunction is detected.

That is, the vehicular apparatus 1 is provided to prevent an incorrect display from being performed due to various types of malfunctions, by shielding such an incorrect display. Such various types of malfunctions may occur not only in the case where a malfunction in the display itself is detected, such as the display being distorted or an unintended display being performed, but also in the case where an incorrect display may be performed due to a malfunction in the application or in the OS 16 on which the application is executed.

Figure 6:
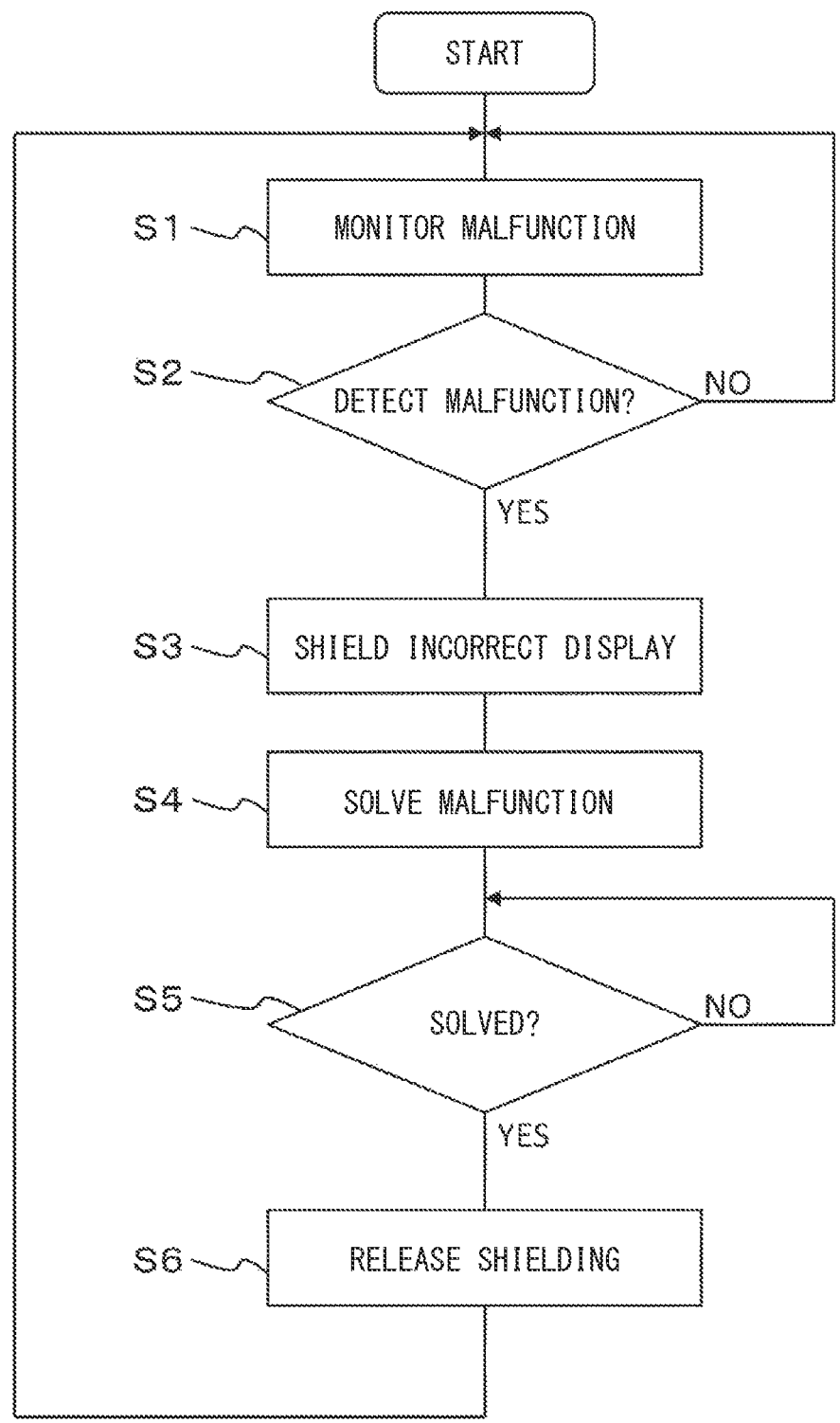
FIG. 6 is a diagram showing a flowchart of monitoring and shielding processing.

Specifically, the vehicular apparatus 1 executes the monitoring and shielding process shown in FIG. 6. Note that this monitoring and shielding process is a process performed in cooperation with the monitoring application 18b, the shielding application 18c, and the like, but for the sake of simplification of the description, the vehicular apparatus 1 will be described here as a subject that executes the process.

In step S1, the vehicular apparatus 1 monitors a malfunction. This monitoring is performed by the monitoring application 18b, and, more specifically, monitors a malfunction that occurs on the OS 16B. Such a malfunction that occur on the OS 16B is assumed to be a malfunction in the OS 16B itself and a malfunction in the application executed on the OS 16B.

In the present embodiment, the vehicular apparatus 1 monitors the lock state, the infinite loop, the reset, and the communication blackout malfunction for each of the OS 16B and the application executed on the OS 16B. This monitoring target includes at least an application that performs a display on the display device.

Note that even if it is not an application that directly performs a display, there are also applications that pass data to the application that performs a display, or applications that may affect other applications or OS 16 when a malfunction occurs. Such applications may be included in the monitoring target.

Subsequently, in step S2, the vehicular apparatus 1 determines whether or not a malfunction is detected. At this time, the monitoring application 18*b* detects a malfunction in the OS 16B itself via the hypervisor 15. This is because an event such as the OS 16B being reset is detected by the hypervisor 15.

Further, if the OS 16B is operating normally but a malfunction occurs in the application, the OS 16B notifies the hypervisor 15. As a result, it is possible to detect that a malfunction has occurred with the monitoring application 18*b*. Alternatively, the monitoring application 18*b* monitors the application running on the OS 16B via the communication path 17C. In that case, the monitoring application 18*b* can detect that a malfunction has occurred based on the fact that there is no response from the monitoring target.

When the malfunction is not detected, the result becomes NO in step S2, so the process proceeds to step S1 and the vehicular apparatus 1 continues monitoring the malfunction. On the other hand, when the malfunction is detected, the result becomes YES in step S2, so the process proceeds to step S3 and the vehicular apparatus 1 shields an incorrect display. That is, the display from the OS 16B or the application running on the OS 16B in which the malfunction is detected is blocked or shielded.

Figure 7:
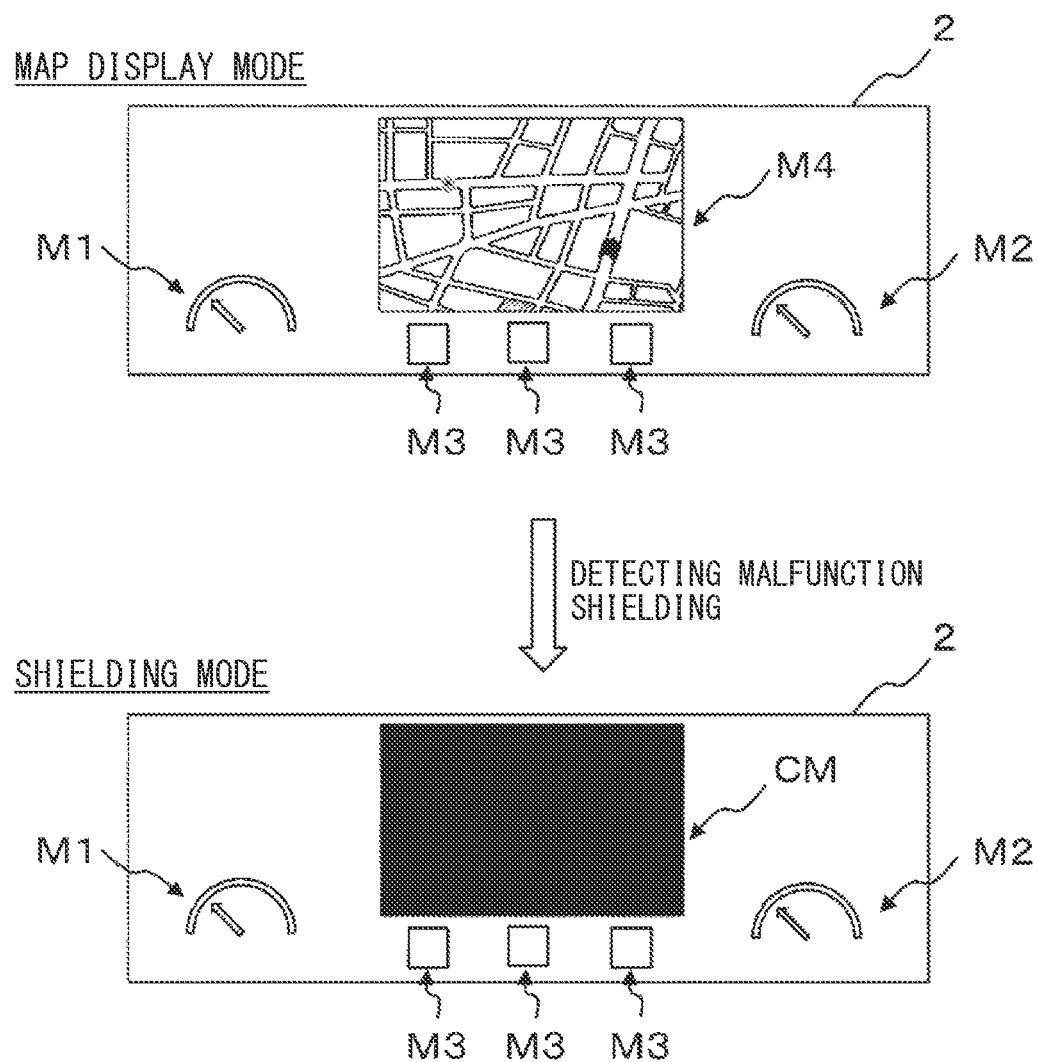
FIG. 7 is a diagram schematically showing a shielding mode.

For example, as shown in FIG. 7, it is assumed that the meter display 2 is in the map display mode. In this case, the meter display 2 shows the speedometer image M1, the tachometer image M2, and the warning light image M3 drawn on the layer 19A by the meter application 18*a* on the OS 16A, and the navigation image M4 drawn on the layer 19B by the navigation application 18*d* on the OS 16B.

At this time, the navigation application 18*d* draws the navigation image M4 in a display area that does not overlap with the speedometer image M1, the tachometer image M2, and the warning light image M3. In other words, the display area where the display from the OS 16B is performed can be considered to be known. Even when the navigation application 18*d* changes the scale of the navigation image M4 drawn with a predetermined size and displays it, the display area in which the navigation image M4 is displayed can be considered to be known. Further, the display area in which the center display 3 and the head-up display 4 are displayed from the OS 16B can be considered to be known.

By the way, the shielding application 18*c* draws in advance the shielding content CM having a size that covers at least a part of the display area displayed from the OS 16B on the layer 19M assigned to itself. Note that the layer 19M is set to be excluded from the synthesis target by the display output unit 11 when a malfunction is not detected by the monitoring application 18*b*. The present embodiment draws the shielding content CM having a size that covers the entire display area displayed from the OS 16B.

Figure 8:
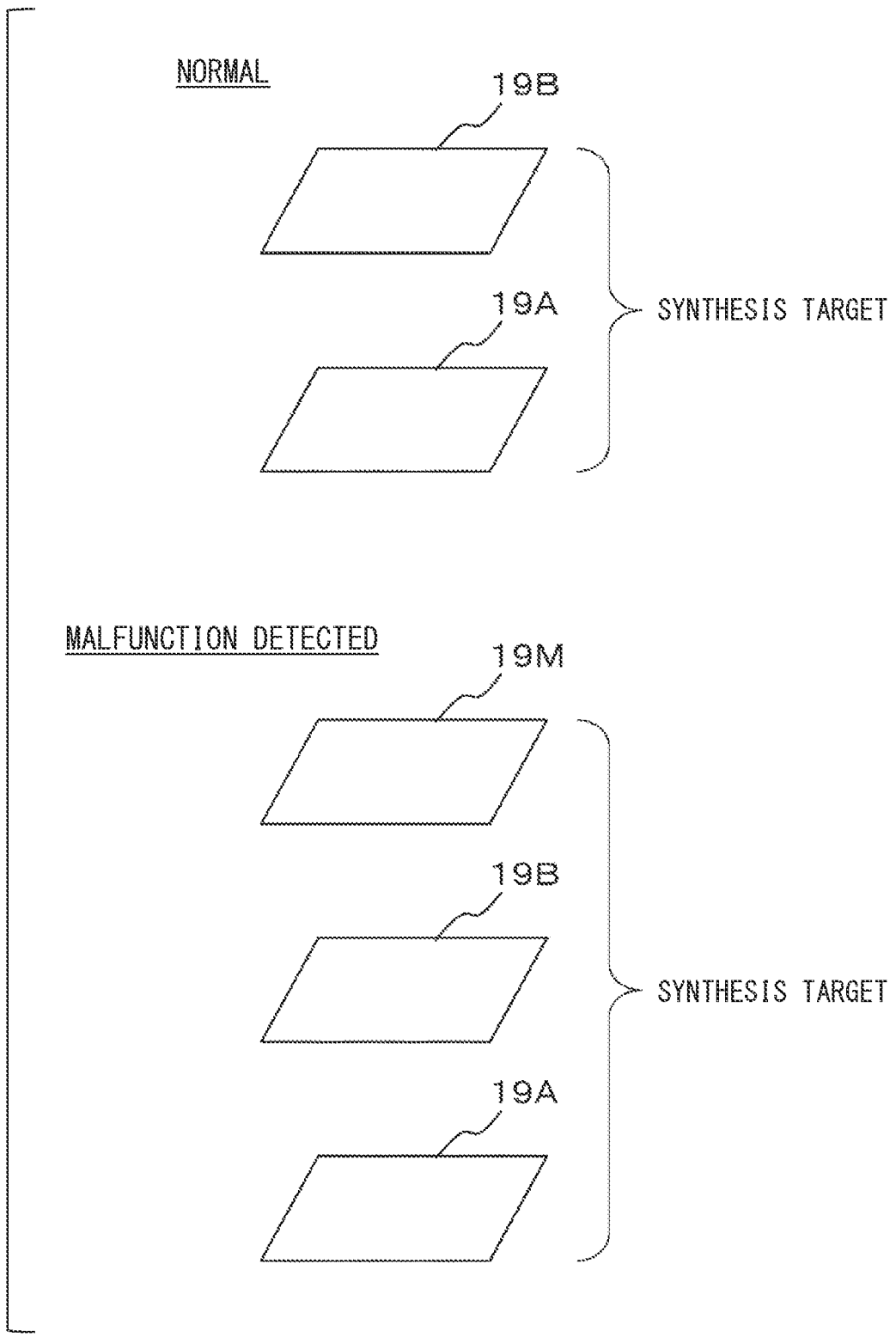
FIG. 8 is a diagram schematically showing a synthesizing mode.

Therefore, as shown in "normal" in FIG. 8, when the malfunction is not detected, the shielding content CM is not displayed on the display device. The setting of whether to add or remove this layer 19M to the synthesis target can be performed by the shielding application 18*c*.

On the other hand, when the vehicular apparatus 1 detects a malfunction on the OS 16B, the vehicular apparatus 1 covers the entire display area where the display from the OS 16B is performed, that is, the entire display area where an incorrect display may be performed is covered with the shielding content CM, thereby to prevent an incorrect display. Specifically, when the monitoring application 18*b* detects a malfunction, the monitoring application 18*b* notifies the shielding application 18*c* that the malfunction is detected. Then, the shielding application 18*c* that has received the notification sets the layer 19M to be a synthesis target by the display output unit 11 as shown in "malfunction detected" in FIG. 8.

As a result, the layer 19M on which the shielding content CM is drawn is added to the synthesis target; the shielding content CM is displayed in a manner of covering the navigation image M4 as shown in "Shielding mode" in FIG. 7. That is, the display from the OS 16B is shielded by the shielding content CM. As a result, even if an incorrect display is performed from the OS 16B, the display is prevented from being displayed on the display device.

Further, the shielding content CM is drawn in a size that shields a display area where an incorrect display may be performed. Therefore, the display from the OS 16A that is operating normally, here, the display of the speedometer image M1, the tachometer image M2, and the warning light image M3 is not shielded by the shielding content CM. Therefore, it is possible to continuously display information on driving and safety.

In FIG. 7, the shielding content CM is shown as a black-painted image for convenience. However, the shielding content CM can be in another mode. For example, the shielding content CM can adopt any color such as red, yellow, or blue. Further, by making the color of the shielding content CM the same as the background color of the meter display 2, it is possible to prevent an incorrect display from being performed without being excessively aware that a malfunction has occurred. Further, the shielding content CM may be in a pattern display mode instead of a single color. Further, the shielding content CM may adopt a video instead of an image.

In step S4, in response to shielding the incorrect display, the vehicular apparatus 1 solves the malfunction as shown in FIG. 6. In this case, the malfunction is solved by a solution means according to the detected malfunction, such as restarting the application or restarting the OS 16B. Then, in step S5, the vehicular apparatus 1 determines whether or not the malfunction is solved.

When the malfunction is not solved, the result becomes NO in step S5 and the vehicular apparatus 1 waits for the malfunction to be solved. It should be noted that the vehicular apparatus 1 does not simply stand by, but executes a process for solving the malfunction.

Then, when the malfunction is solved, the result becomes YES in step S5, and the vehicular apparatus 1 releases the shielding in step S6. In this case, the shielding can be released by setting the layer 19M to be excluded from the synthesis target by the shielding application 18*c*. After that, the vehicular apparatus 1 proceeds to step S1 and continues monitoring the malfunction.

In this way, the vehicular apparatus 1 monitors the malfunction in the virtual environment 14. When the malfunction is detected, the vehicular apparatus 1 prevents an incorrect display from being performed on the display device.

According to the vehicular device 1 described above, the following effects can be achieved.

In a vehicular apparatus 1, a plurality of OSs 16 each perform a display on a display device. The vehicular apparatus 1 includes a controller unit 10, a monitoring application 18*b* serving as a monitoring unit 18*b*, and a shielding application 18c serving as a shielding unit 18c. The controller unit 10 is configured to implement a virtual environment 14 to operate the plurality of OSs 16. The monitoring application 18b is configured to monitor and detect a malfunction in performing the display on the display device in the virtual environment 14. The shielding application 18c is configured to shield a display area where an incorrect display may be performed in response to the malfunction being detected by the monitoring application 18b.

According to the above configuration, when a malfunction occurs in the virtual environment 14, the display area where an incorrect display may be performed due to the malfunction is shielded. Therefore, it is possible to prevent an incorrect display from being performed in the virtual environment 14 in which the plurality of OSs 16 each perform a display on the display device.

The vehicular apparatus 1 includes a display output unit 11 configured to synthesize a plurality of layers 19 having a hierarchical structure to provide a synthesis result and output the synthesis result as a drawing data to the display device. The display output unit 11 is further configured to synthesize the plurality of layers 19 serving as a synthesis target to provide the synthesis result such that a relatively hierarchically higher layer being the layer 19 with a relatively higher hierarchy in the hierarchical structure is displayed with priority over a relatively hierarchically lower layer being the layer 19 with a relatively lower hierarchy in the hierarchical structure. The shielding application 18c is further configured to draw in advance a shielding content CM on a shielding layer 19M that is the layer 19M hierarchically higher than the layers 19A, 19B assigned to the plurality of OSs 16 to cover a malfunctioning display. The shielding application 18c is further configured to shield the display area, where the incorrect display may be performed, by using the shielding content CM by setting to include the shielding layer 19M in the synthesis target by the display output unit 11 in response to the malfunction being detected by the monitoring application 18b.

As a result, the display area where an incorrect display may be performed is covered with the shielding content CM, and the shielding content CM is displayed on the display device. That is, the display area where an incorrect display may be performed is blindfolded by the shielding content CM. Therefore, it is possible to prevent an incorrect display.

In the vehicular apparatus 1, the monitoring application 18b monitors a malfunction in the OS 16 or a malfunction in the application executed on the OS 16, as a display malfunction on the display device. Then, the shielding application 18c displays a shielding content CM that covers at least the content drawn by the malfunctioning OS 16 among the contents drawn on the layers 19 assigned respectively to the plurality of OSs 16. By doing so, the display area where an incorrect display may be performed is shielded.

As a result, although the display area where an incorrect display may be performed is blocked, the display from the normally operating side can be prevented from being blocked. Therefore, for example, the display of the speedometer image M1 and the like is continued, and the decrease in safety is suppressed. Further, by drawing the shielding content CM in advance, it is not necessary to draw when a malfunction is detected, and it is possible to prevent the shielding process from overwhelming the process of solving the malfunction.

In the vehicular apparatus 1, the plurality of OSs 16 include an OS 16A having a relatively high stability and an OS 16B having a relatively low stability. The monitoring application 18b and the shielding application 18c are provided as applications executed on the OS 16A, which has relatively high stability. As a result, the stability of the monitoring application 18b and the shielding application 18c themselves can be improved; as a result, it becomes possible to more reliably prevent an incorrect display.

In the embodiment, for the sake of simplification of the explanation, the process from monitoring a malfunction up to releasing the shielding has been described as a series of processing, but monitoring the malfunction and releasing the malfunction and shielding can be executed as separate processes. As a result, it is possible to monitor whether or not another malfunction has occurred even during shielding or solving the malfunction.

In the present embodiment, an example in which the layer 19M is provided in a layer higher than the layer 19 assigned to each OS 16 is shown, but the uppermost layer 19 in the hierarchical structure may be the layer 19M.

Second Embodiment

Hereinafter, a second embodiment will be described. In the second embodiment, a shielding mode different from that of the first embodiment will be described. Since the configuration of the vehicular apparatus 1, the flowchart of the monitoring and shielding process, the hierarchical structure of the layer 19, and the like are common to those of the first embodiment, they will be described with reference to FIGS. 1 to 7.

In the first embodiment, when a malfunction is detected, a display area where an incorrect display may be performed is shielded by including the layer 19M in the synthesis target. In contrast, the vehicular apparatus 1 of the present embodiment shields a display area where an incorrect display may be performed by changing the transmittance of the layer 19M.

Figure 9:
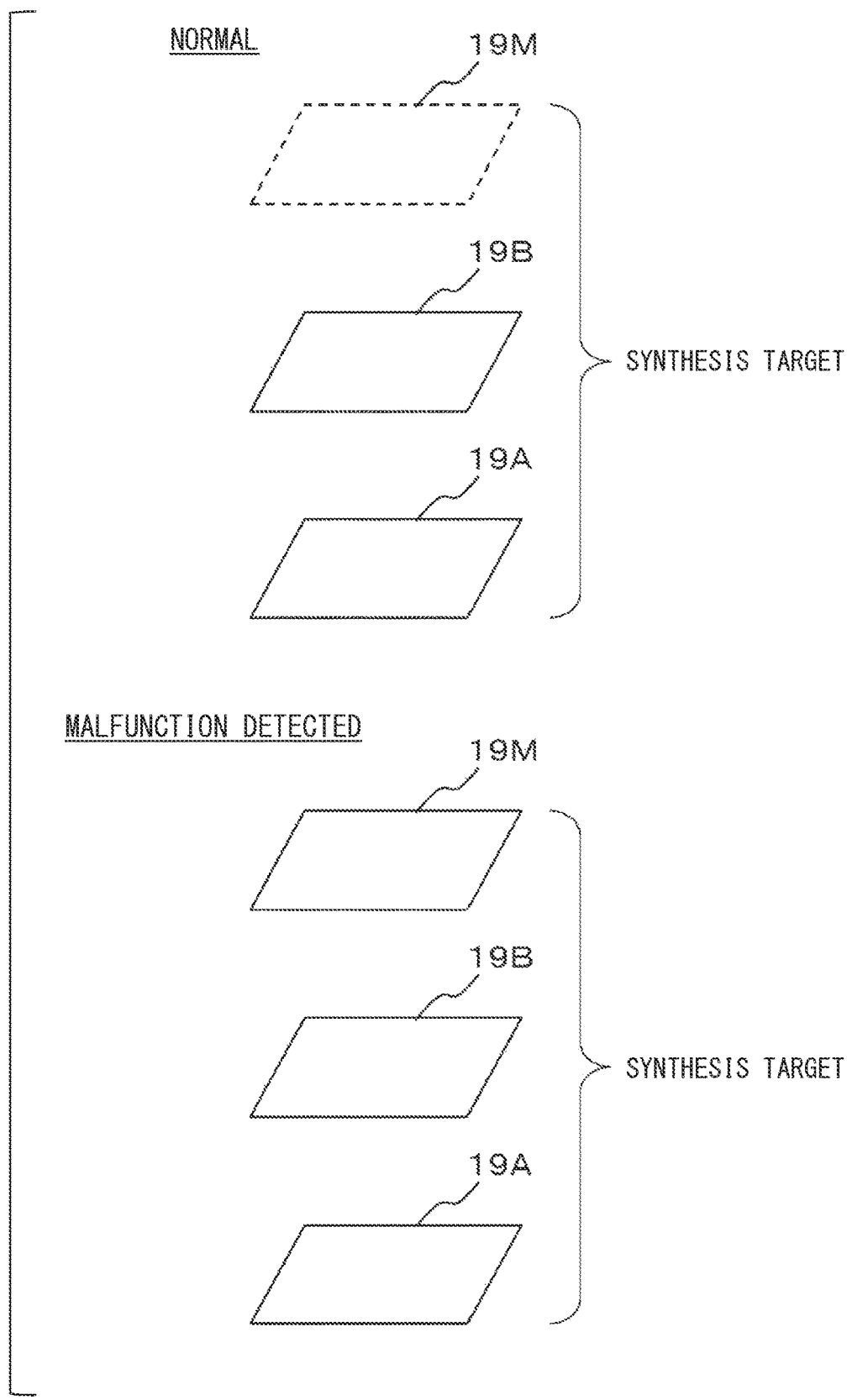
FIG. 9 is a diagram schematically showing a synthesizing mode according to a second embodiment.

Specifically, the shielding application 18c draws the shielding content CM on the layer 19M in advance as in the first embodiment. At this time, the shielding application 18c sets to add the layer 19M to the synthesis target even when the malfunction is not detected. However, when the malfunction is not detected, the shielding application 18c sets the transmittance of the layer 19M to 100% as shown in "normal" in FIG. 9. Note that FIG. 9 schematically shows that the layer 19M is transparent by making the layer 19M a broken line.

The higher the numerical value of the transmittance becomes, the more transparent the layer 19M becomes. At 100%, the layer 19 becomes completely transparent. That is, the shielding application 18c makes the layer 19M on which the shielding content CM is drawn transparent when no malfunction is detected. As a result, even if it is added to the synthesis target, it is not displayed on the display device.

Then, when a malfunction is detected in step S2 of the monitoring and shielding process shown in FIG. 6, the vehicular apparatus 1 lowers the transmittance of the layer 19M in step S3 as compared with the case where no malfunction has occurred. As a result, the layer 19M becomes opaque, as shown in FIG. 9 when a malfunction is detected. In FIG. 9, the layer 19M is shown by a solid line to schematically show that the layer 19M has become opaque.

Since the layer 19M is originally included in the synthesis target, the shielding content CM whose transparency cannot be lowered is displayed. As a result, for example, when a malfunction is detected in the map display mode shown in FIG. 7, a shielding content CM having low transparency is displayed. As shown as the shielding mode, the display area where an incorrect display may be performed is shielded by the shielding content CM.

As described above, the vehicular apparatus 1 draws in advance a shielding content (CM) on a shielding layer 19 that is the layer hierarchically higher than the layers assigned to the plurality of OSs 16 so as to cover a malfunctioning display. Then the vehicular apparatus 1 sets the transmittance of the shielding layer 19 in a state where a malfunction being detected by the monitoring unit 18b to be hierarchically lower than the transmittance of the shielding layer 19 in a state where the malfunction is not detected. Thereby, the display area where the incorrect display may be performed is shielded by the shielding content CM.

Even with such a configuration, when a malfunction occurs in the virtual environment 14, the display area where an incorrect display may be performed due to the malfunction is shielded. Therefore, it is possible to prevent an incorrect display from being performed in the virtual environment 14 in which the plurality of OSs 16 each perform a display on the display device. Further, by drawing the shielding content CM in advance, it is possible to reduce the amount of processing to be performed when a malfunction is detected. Thus, it is possible to suppress, for example, the processing for solving the malfunction from being overwhelmed.

Third Embodiment

Hereinafter, a third embodiment will be described. In the third embodiment, a shielding mode different from that of the first embodiment will be described. Since the configuration of the vehicular apparatus 1, the flowchart of the monitoring and shielding process, the hierarchical structure of the layer 19, and the like are common to those of the first embodiment, they will be described with reference to FIGS. 1 to 7.

In the first embodiment, when a malfunction is detected, an example is shown in which a display area where an incorrect display may be performed is shielded by a shielding content CM drawn on the layer 19M. However, the vehicular apparatus 1 of the present embodiment shields a display area where an incorrect display may be performed by the layer 19A assigned to the OS 16A.

Suppose a case where the vehicular apparatus 1 is in a state where the display is performed from the OS 16A and the OS 16B as in the meter display 2, and no malfunction is detected. In such a case, as shown in "normal" in FIG. 10, the layer 19B is synthesized so as to be higher in the hierarchy than the layer 19A. As a result, as shown in "map display mode" in FIG. 11, when no malfunction is detected, the navigation image M4, which is the content drawn on the layer 19B, is displayed.

Figure 10:
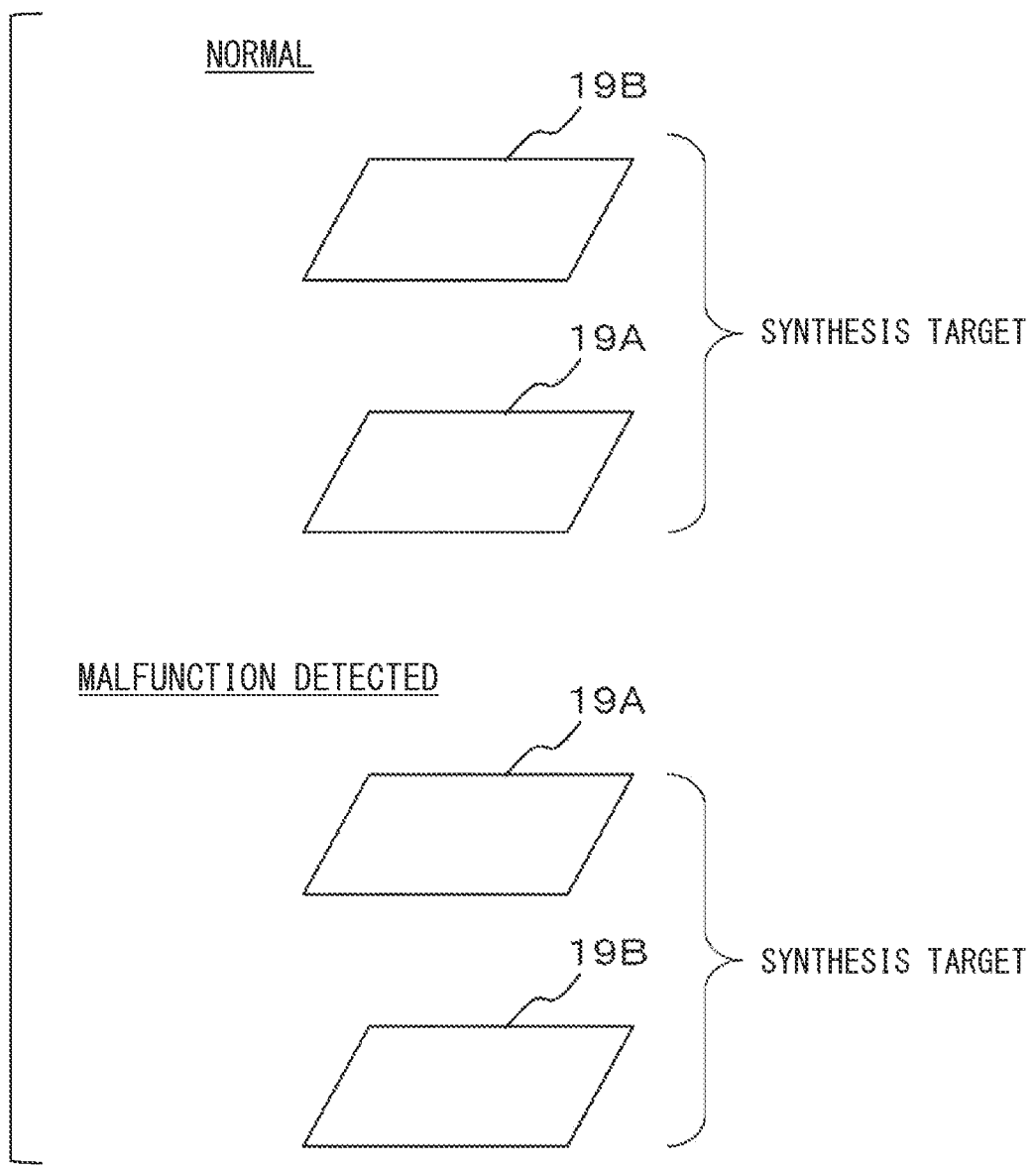
FIG. 10 is a diagram schematically showing a synthesizing mode (part 1) according to a third embodiment.

On the other hand, as shown in "malfunction detected" in FIG. 10, the vehicular apparatus 1 synthesizes the layer 19B so as to be lower in the layer than the layer 19A when the malfunction is detected. That is, the vehicular apparatus 1 synthesizes by exchanging the arrangement of the layers 19 for the synthesis target.

Figure 11:
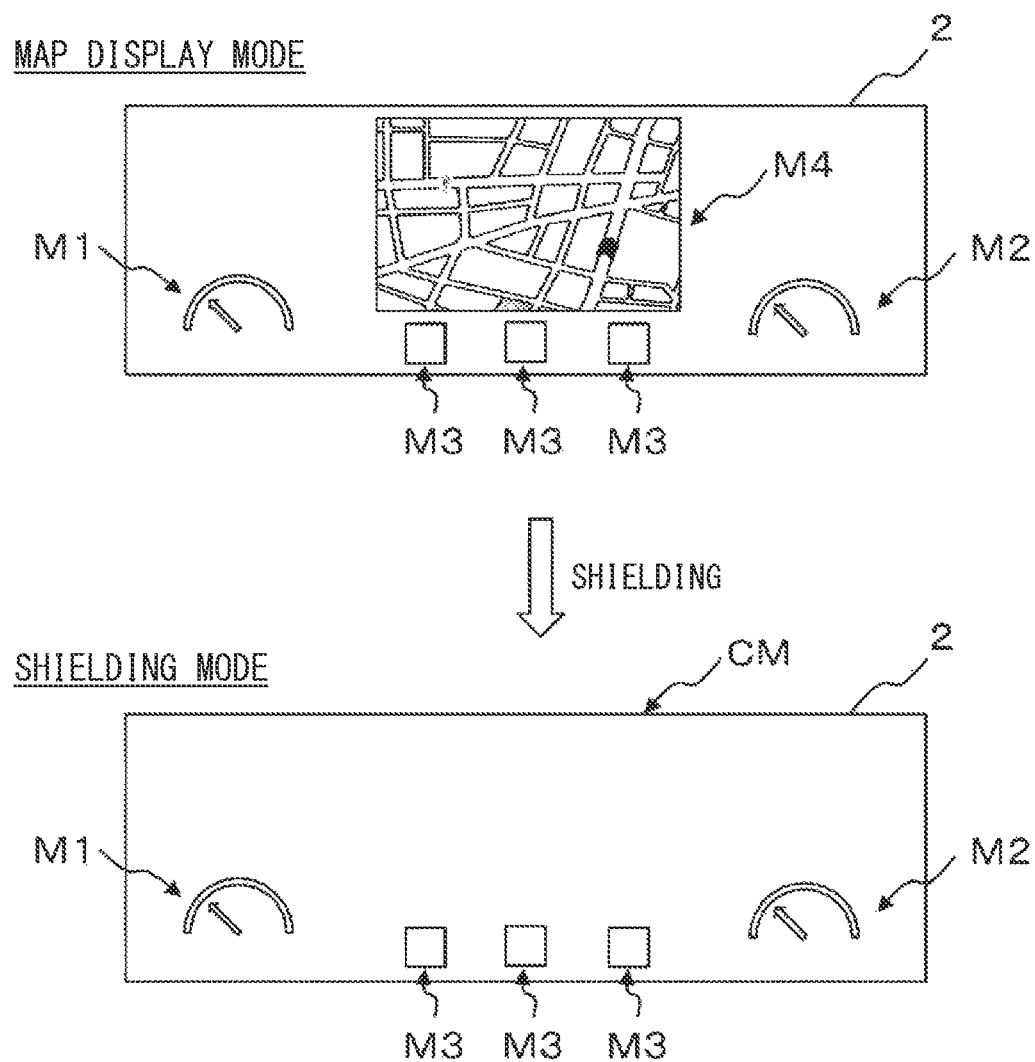
FIG. 11 is a diagram schematically showing a shielding mode.

As a result, as shown in "shielding mode" in FIG. 11, the speedometer image M1, the tachometer image M2, and the warning light image M3, which are the contents drawn on the layer 19A, are displayed. At the same time, the display area where the navigation image M4 is displayed is shielded by the background of the layer 19A. That is, the vehicular apparatus 1 shields the display area where an incorrect display may be performed by using the display from the OS 16A, which has relatively high stability, as the shielding content CM.

That is, the layers 19 are assigned respectively to the OS 16A, which has relatively high stability, and the OS 16B, which has relatively low stability. When a malfunction is detected by the monitoring application 18b, the layer 19A assigned to the relatively stable OS 16A is placed hierarchically higher than the layer 19B assigned to the relatively stable OS 16B. As a result, the display area where an incorrect display may be performed is shielded by the display by the OS 16A, which has relatively high stability.

Even with such a configuration, when a malfunction occurs in the virtual environment 14, the display area where an incorrect display may be performed due to the malfunction is shielded. Therefore, it is possible to prevent an incorrect display from being performed in the virtual environment 14 in which the plurality of OSs 16 each perform a display on the display device. In addition, since it can be shielded by exchanging the layers 19, the amount of processing to be performed when a malfunction is detected can be reduced. For example, it is possible to suppress the load on the process for solving the malfunction.

Alternatively, when a malfunction is detected by the monitoring application 18b, the vehicular apparatus 1 excludes the layer 19 assigned to the OS 16 in which the malfunction is detected from the display target. As a result, it is possible to shield the display area where an incorrect display may be performed from the OS 16 where the malfunction has occurred.

Figure 12:
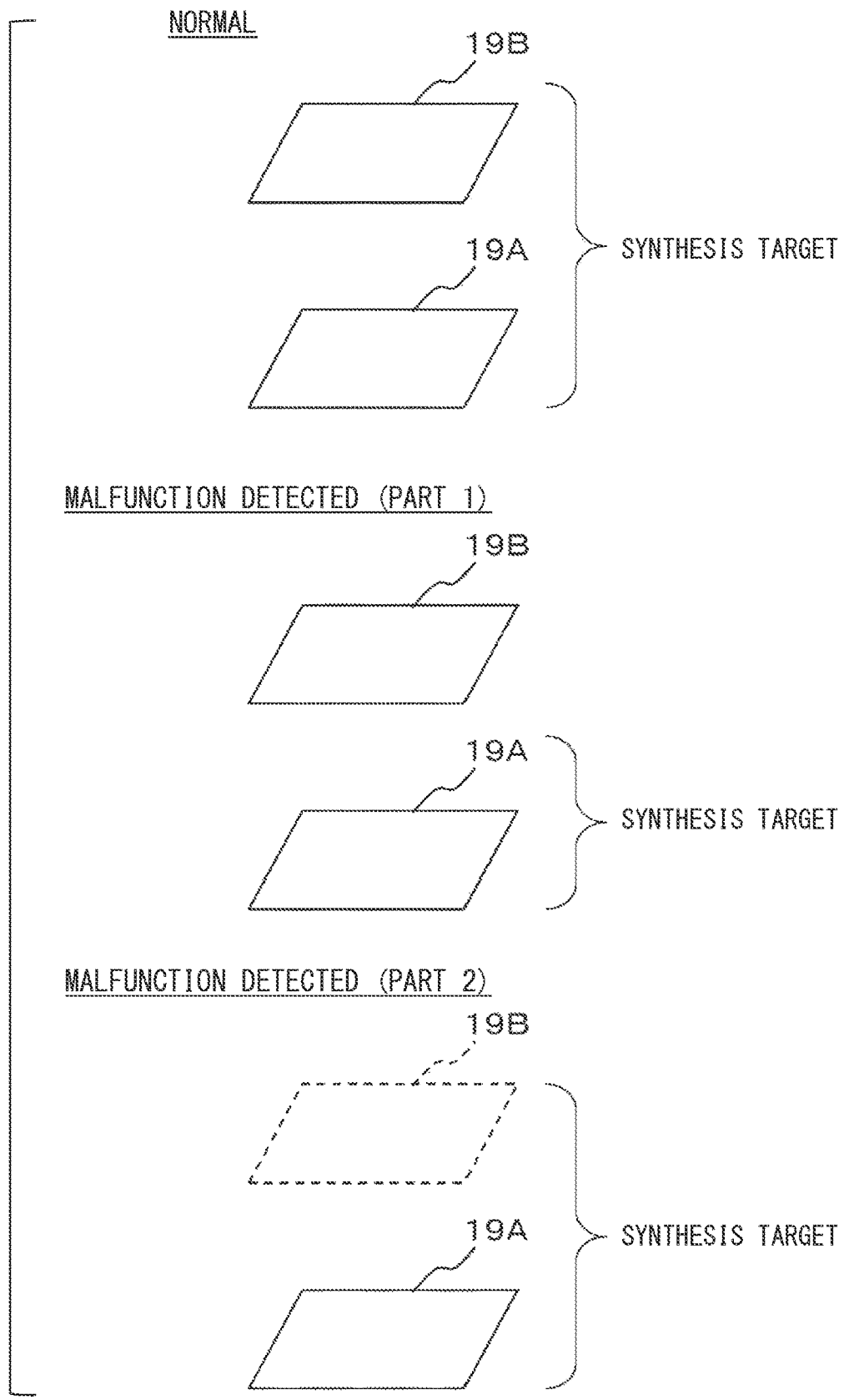
FIG. 12 is a diagram schematically showing a synthesizing mode (part 2)

In this case, as shown as "malfunction detected (part 1)" in FIG. 12, the vehicular apparatus 1 excludes the layer 19B assigned to the OS 16B in which a malfunction is detected from the synthesis target. As a result, the layer 19B can be excluded from the display target.

Even with such a configuration, when a malfunction occurs in the virtual environment 14, the display area where an incorrect display may be performed due to the malfunction is shielded. Therefore, it is possible to prevent an incorrect display from being performed in the virtual environment 14 in which the plurality of OSs 16 each perform a display on the display device. Further, the display performed on the layer 19A can be continued, and it is possible to prevent the speedometer image M1 and the like required for traveling from being not displayed.

Alternatively, as shown in "malfunction detected (part 2)" in FIG. 12, the vehicular apparatus 1 makes the transmittance of the layer 19B, which is assigned to the OS 16B in which the malfunction is detected, higher than that in the case where the malfunction has not occurred. As a result, the layer 19B can be substantially excluded from the display target. In this case, if the transmittance is 100%, the layer 19B becomes transparent. Note that FIG. 12 schematically shows that the layer 19B is transparent by showing the layer 19B with a broken line. Further, even if the layer 19B is made transparent, the display of the contents of the layer 19A is continued. Therefore, it is possible to prevent the speedometer image M1 and the like required for traveling from being not displayed.

Even with such a configuration, when a malfunction occurs in the virtual environment 14, the display area where an incorrect display may be performed due to the malfunction is shielded. Therefore, it is possible to prevent an incorrect display from being performed in the virtual environment 14 in which the plurality of OSs 16 each perform a display on the display device.

Fourth Embodiment

Hereinafter, a fourth embodiment will be described. In the fourth embodiment, a shielding mode in which the first to third embodiments are extended will be described. Since the configuration of the vehicular apparatus 1, the flowchart of the monitoring and shielding process, the hierarchical structure of the layer 19, and the like are common to those of the first embodiment, they will be described with reference to FIGS. 1 to 7.

As shown in each embodiment, it is considered that the incorrect display can be prevented by shielding the display area where the incorrect display may be performed. Note that, if the previously displayed content disappears, it is assumed that the user will receive that some setting has been changed rather than an occurrence of a malfunction.

In this case, there is a risk that the attention may be deviated from the running when the user or driver operates the vehicular apparatus 1 in an attempt to restore the setting. Moreover, even if the malfunction can be recovered immediately, there is a possibility that the user may be overly worried or distrustful. Therefore, the vehicular apparatus 1 does not simply hide the fact that a malfunction has occurred, but does not give the user a sense of distrust or anxiety.

Figure 13:
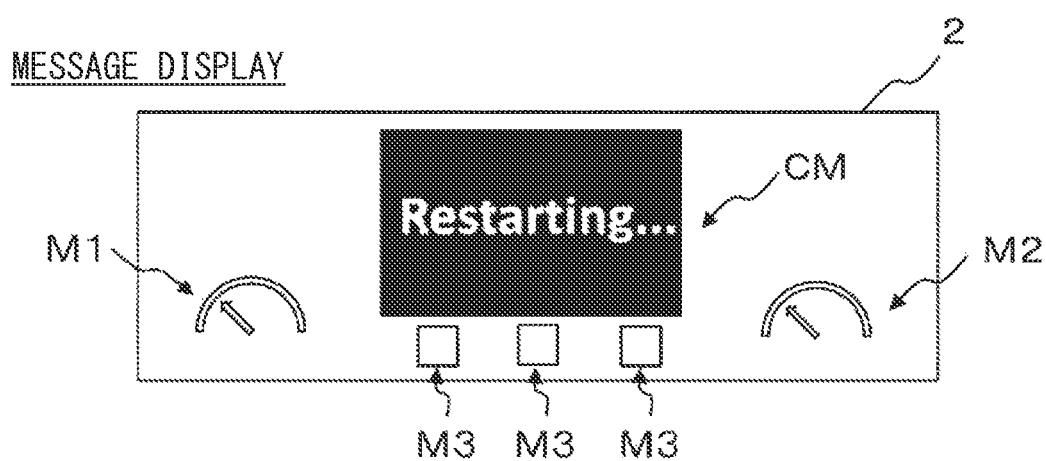
FIG. 13 is a diagram schematically showing a shielding mode (part 1) according to a fourth embodiment.

Specifically, as shown in FIG. 13, the vehicular apparatus 1 displays a message such as "Restarting . . . " when the display area where an incorrect display may be performed is shielded by the shielding content CM, for example. That is, the vehicular apparatus 1 is configured to notify the user of the content of the malfunction in a manner that can be visually recognized by the user when shielding the display area where an incorrect display may be performed. In FIG. 13, it is notified that the OS 16 or the application is restarted in order to solve the malfunction.

In this way, by intentionally notifying the user of the content of the malfunction, the user can understand why the display has changed. In addition, the user can grasp that the vehicular apparatus 1 is operating in order to solve the malfunction. As a result, it is possible to suppress distrust and anxiety given to the user. This message can be drawn in advance on the layer 19M, or can be newly drawn when the shielding content CM is displayed.

Figure 14:
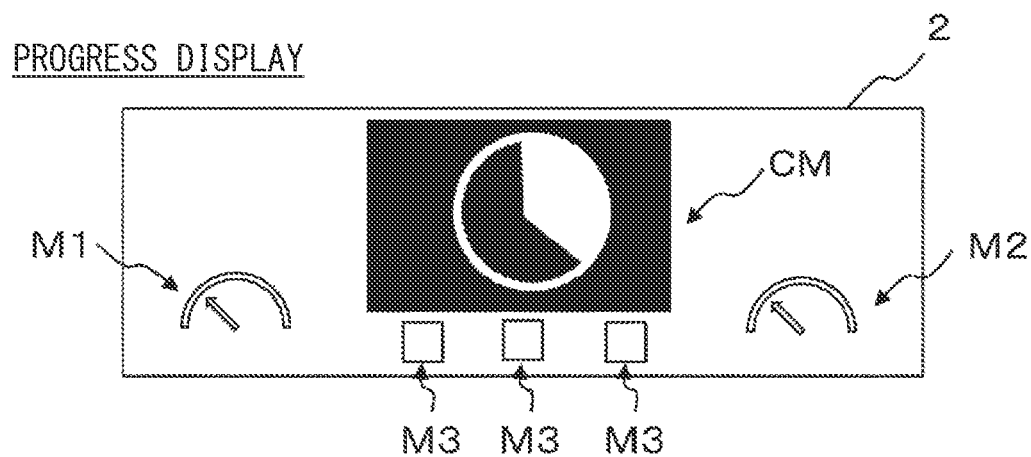
FIG. 14 is a diagram schematically showing a shielding mode (part 2)

Further, as shown in FIG. 14, the vehicular apparatus 1 can display a clock image together with the shielding content CM, and can notify the user of the remaining time of restart as a progress display, for instance. That is, the vehicular apparatus 1 can be configured to newly draw an image capable of presenting the degree of resolution of the malfunction on the shielding content CM or in the vicinity of the shielding content CM.

Even with such a configuration, the user can grasp the cause of the change in the display and that the vehicular apparatus 1 is operating in order to deal with the cause. Distrust and anxiety will thus be suppressed. The clock image is an example, and a progress bar or the like can be displayed, for example. Alternatively, by displaying an animation image, it can be shown that the vehicular apparatus 1 is in operation.

Figure 15:
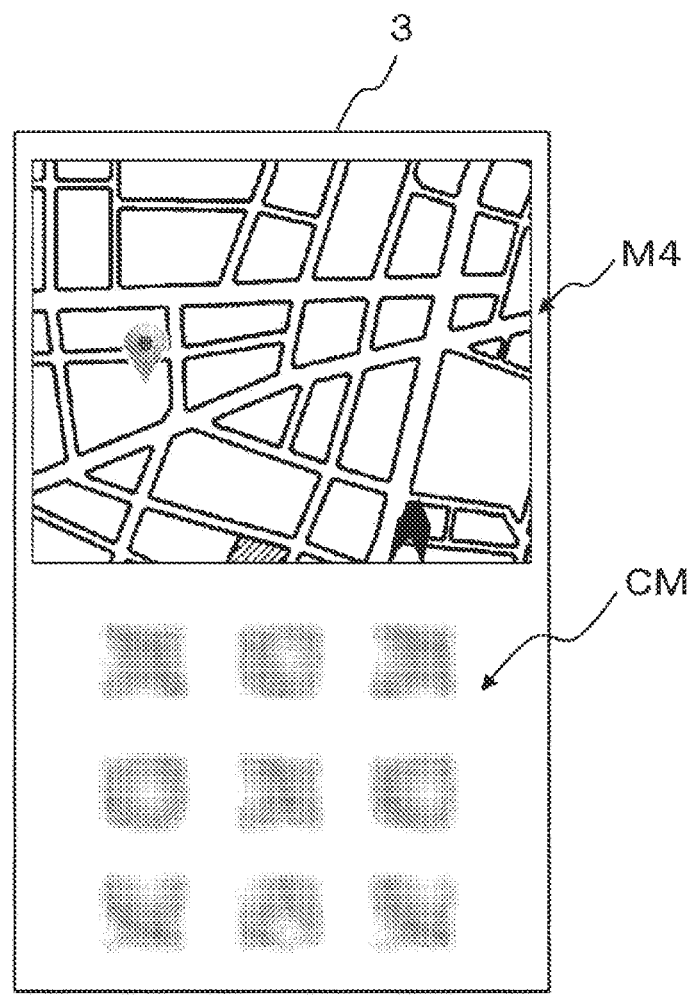
FIG. 15 is a diagram schematically showing a shielding mode (part 3).

Further, as shown in FIG. 15, the vehicular apparatus 1 has, for example, a blurred display of the menu image M5. This makes it possible to notify that the menu cannot be operated. In this case, an image in which the menu image M5 is blurred is prepared in advance as a shielding content CM. It is also possible to display the shielding content CM when a malfunction is detected.

Even with such a configuration, the user can grasp the cause of the change in the display and that the vehicular apparatus 1 is operating in order to deal with the cause. Distrust and anxiety will thus be suppressed. If a shielding content CM with a blurred map image is prepared in advance, it is possible to deal with a case where an incorrect display is performed in the display area of the navigation image M4.

OTHER EMBODIMENTS

Although different shielding modes have been individually described in the first to third embodiments, the shielding mode to be adopted may be different depending on the display device. Further, in one display device, different shielding modes can be adopted depending on the size and position of the display area to be shielded.

The embodiments have described an example in which the shielding content CM is drawn on the layer 19M in advance. However, when a malfunction is detected, the shielding content CM can be newly drawn to shield the display area where an incorrect display may be performed by the shielding content CM.

The embodiments have described an example where the display is performed from the OS 16A and the OS 16B. However, even when the display is performed from the OS 16B, the display area from which an incorrect display may be performed can be shielded by the display from the OS 16A. In this case, the content corresponding to the shielding content CM may be drawn from the OS 16A.

The embodiments have described mainly an example of the meter display 2. However, in the center display 3 or the head-up display 4, the display area where an incorrect display may be performed is shielded as in each embodiment. As a result, it is possible to prevent an incorrect display.

In each embodiment, it is assumed that a malfunction occurs during the operation of the vehicular apparatus 1. However, there is a possibility that an incorrect display is performed on the display device even when the vehicular apparatus 1 is started. For example, if the OS 16B is in the process of being started when the OS 16A is started and the initialization of the display is completed, the boot log of the OS 16B may be displayed. Therefore, if there is a possibility that an incorrect display is performed when the vehicular apparatus 1 is started, a monitoring unit and a shielding unit are provided on the fast-starting OS 16A or hypervisor 15 as described in each embodiment. As a result, it is possible to shield the display area where an incorrect display may be performed.

The embodiments have described a configuration in which a monitoring unit and a shielding unit are provided on the OS 16A. However, a monitoring unit and a shielding unit may be provided on the hypervisor 15, which is software that is considered to be relatively more stable than the OS 16B in the virtual environment 14.

Although the present disclosure has been described in accordance with embodiments, it is understood that the present disclosure is not limited to such embodiments or structures. The present disclosure also includes various modifications and modifications within an equivalent range. In addition, various combinations and forms, and further, other combinations and forms including only one element, or more or less than these elements are also within the sprit and the scope of the present disclosure.

In the above embodiment, the controller unit 10 may be provided as one or more than one controller. Such a controller and method thereof described in the present disclosure may be implemented by one or more than one special-purpose computer. Such a special-purpose computer may be created (i) by configuring (a) a memory and a processor programmed to execute one or more particular functions embodied in computer programs, or (ii) by configuring (b) a processor provided by one or more special-purpose hardware logic circuits, or (iii) by configuring a combination of (a) a memory and a processor programmed to execute one or more particular functions embodied in computer programs and (b) a processor provided by one or more special-purpose hardware logic circuits.

The computer program may be stored in a computer-readable non-transitory tangible storage medium as instructions to e executed by a computer.

For reference to further explain features of the present disclosure, the description is added as follows.

The display device connected to a vehicular apparatus may be shared by several systems. For example, there is disclosed a technique for sharing a display device between a vehicular apparatus and a mobile terminal connected to the vehicular apparatus.

In order to integrate a plurality of functions, a plurality of systems may be provided in a vehicular apparatus. Specifically, a virtual environment may be configured in a vehicular apparatus, and a plurality of operating systems may be operated in the virtual environment. Hereinafter, the operating system is referred to as an OS. In such a vehicular apparatus, each OS may individually perform a display on the display device.

A malfunction may arise in cases that each OS individually performs a display on the display device. In such a case, there is a possibility that an incorrect display may be performed, such as stopping of performing a display or performing a display of an unintended screen image.

It is thus desired for the present disclosure to provide a vehicular apparatus capable of preventing performing of an incorrect display in a virtual environment in which a plurality of operating systems are provided to perform a display on a display device.

An aspect of the present disclosure described herein is set forth in the following clauses.

According to an aspect of the present disclosure, a vehicular apparatus is provided in which a plurality of operating systems each perform a display on a display device. The vehicular apparatus includes a controller unit, a monitoring unit, and a shielding unit. The controller unit is configured to implement a virtual environment to operate the plurality of operating systems. The monitoring unit is configured to monitor and detect a malfunction in the display performed on the display device in the virtual environment. The shielding unit is configured to shield a display area where an incorrect display may be performed in response to the malfunction being detected by the monitoring unit.

Such a configuration provides a virtual environment in which a plurality of operating systems each perform a display on a display device. Under such a virtual environment, the display area where an incorrect display may be performed is shielded. It is therefore to prevent an incorrect display.

What is claimed is:

1. A vehicular apparatus in which a display is performed on a display device under each of a plurality of operating systems, the vehicular apparatus comprising:

a controller unit configured to implement a virtual environment to operate the plurality of operating systems;

a monitoring unit configured to monitor and detect a malfunction in the display performed on the display device in the virtual environment;

a shielding unit configured to shield a display area where an incorrect display may be performed in response to the malfunction being detected by the monitoring unit; and a display output unit configured to synthesize a plurality of layers having a hierarchical structure to output drawing data to the display device;

wherein:

the plurality of operating systems are respectively assigned to the plurality of layers;

the plurality of operating systems include a relatively stable operating system and a relatively less stable operating system;

the monitoring unit is further configured to monitor a malfunction due to an operating system including (i) a malfunction exhibited by the operating system or (ii) a malfunction of an application executed on the operating system, as the malfunction in the display performed on the display device; and in response to the malfunction due to the operating system being detected by the monitoring unit, the shielding unit is further configured to shield the display area, where the incorrect display may be performed, by excluding the layer assigned to the operating system due to which the malfunction is detected, from a display target.

2. The vehicular apparatus according to claim 1, wherein:

the display output unit is further configured to synthesize the plurality of layers as a synthesis target such that a relatively hierarchically higher layer having a relatively higher hierarchy in the hierarchical structure is displayed with priority over a relatively hierarchically lower layer having a relatively lower hierarchy in the hierarchical structure;

the shielding unit is further configured to draw in advance a shielding content on a shielding layer that is a one layer hierarchically higher than the layers assigned to the plurality of operating systems to cover a malfunctioning display; and the shielding unit is further configured to shield the display area, where the incorrect display may be performed, with the shielding content by setting to include the shielding layer in the synthesis target synthesized by the display output unit in response to the malfunction being detected by the monitoring unit.

3. The vehicular apparatus according to claim 1, wherein:

the display output unit is further configured to synthesize the plurality of layers as a synthesis target such that a relatively hierarchically higher layer having a relatively higher hierarchy in the hierarchical structure is displayed with priority over a relatively hierarchically lower layer having a relatively lower hierarchy in the hierarchical structure;

the shielding unit is further configured to draw in advance a shielding content on a shielding layer that is a one layer hierarchically higher than the layers assigned to the plurality of operating systems to cover a malfunctioning display; and the shielding unit is further configured to shield the display area, where the incorrect display may be performed, with the shielding content by setting a transmittance of the shielding layer in a state where the malfunction is detected by the monitoring unit to be lower than the transmittance of the shielding layer in a state where the malfunction is not detected by the monitoring unit.

4. The vehicular apparatus according to claim 1, wherein the shielding unit is further configured to shield the display area, where the incorrect display may be performed, with the display performed by the relatively stable operating system by setting the layer assigned to the relatively stable operating system to be hierarchically higher than the layer assigned to the relatively less stable operating system in response to the malfunction being detected by the monitoring unit.

5. The vehicular apparatus according to claim 1, wherein:

in response to the shielding unit shielding the display area where the incorrect display may be performed, the shielding unit is further configured to notify a user of a content of the malfunction visually.

6. The vehicular apparatus according to claim 1, wherein:

the monitoring unit and the shielding unit are provided as applications executed on the relatively stable operating system.

7. A vehicular apparatus comprising:

one or more than one processor coupled to a display device in a vehicle; and one or more than one memory coupled to the processor, the one or more than one memory storing computer-readable programs including instructions configured to, when executed by the processor, cause the processor to implement:

a virtual environment;

a plurality of operating systems to operate in the virtual environment;

a plurality of applications each executed on one of the plurality of operating systems to perform a display on the display device;

a monitoring application that is a first one of the plurality of applications configured to monitor and detect a malfunction in the display performed on the display device in the virtual environment;

a shielding application that is a second one of the plurality of applications configured to shield a display area where an incorrect display may be performed on the display device in response to the malfunction being detected by the monitoring application;

a display output unit configured to synthesize a plurality of layers having a hierarchical structure to output drawing data to the display device;

wherein:

the plurality of operating systems are respectively assigned to the plurality of layers;

the plurality of operating systems include a relatively stable operating system and a relatively less stable operating system;

the monitoring application is further configured to monitor a malfunction due to an operating system including (i) a malfunction exhibited by the operating system or (ii) a malfunction of an application executed on the operating system, as the malfunction in the display performed on the display device; and in response to the malfunction due to the operating system being detected by the monitoring application, the shielding application is further configured to shield the display area, where the incorrect display may be performed, by excluding the layer assigned to the operating system due to which the malfunction is detected, from a display target.

8. The vehicular apparatus according to claim 7, wherein:

the instructions are configured to, when executed by the processor, further cause the processor to implement:

an image processing application that is a third one of the plurality of applications configured to synthesize the plurality of layers having a hierarchical structure to output a drawing data to the display device, wherein:

the image processing application is further configured to synthesize the plurality of layers as a synthesis target such that a relatively hierarchically higher layer having a relatively higher hierarchy in the hierarchical structure is displayed with priority over a relatively hierarchically lower layer having a relatively lower hierarchy in the hierarchical structure;

the shielding application is further configured to draw in advance a shielding content on a shielding layer that is a one layer hierarchically higher than the layers assigned to the plurality of operating systems to cover a malfunctioning display; and to shield the display area, where the incorrect display may be performed, with the shielding content by setting to include the shielding layer in the synthesis target synthesized by the image processing application in response to the malfunction being detected by the monitoring application.

* * * * *